(12) United States Patent
Bowers et al.

(10) Patent No.: US 8,836,530 B1
(45) Date of Patent: Sep. 16, 2014

(54) PROXIMITY WAKEUP

(75) Inventors: Andrew Bowers, San Francisco, CA (US); Kevin Tom, San Francisco, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/165,391

(22) Filed: Jun. 21, 2011

(51) Int. Cl.
| G08B 21/00 | (2006.01) |
| G08B 13/14 | (2006.01) |
| G08B 1/08 | (2006.01) |
| G06F 15/16 | (2006.01) |
| G06F 12/00 | (2006.01) |
| G06F 17/00 | (2006.01) |
| G06F 3/00 | (2006.01) |

(52) U.S. Cl.
USPC ............ 340/686.6; 340/517; 340/539.23; 340/686.1; 340/687; 726/7; 726/21; 715/741

(58) Field of Classification Search
CPC ........... G06F 2221/2129; G06F 2221/2137; G06F 2221/2141; G06F 2221/2149; G06F 2221/2147
USPC ............ 340/686.6, 686.1, 517, 539.23, 687; 726/7, 21; 715/741
See application file for complete search history.

(56) References Cited

U.S. PATENT DOCUMENTS

| 5,784,463 | A | | 7/1998 | Chen et al. |
| 6,118,888 | A | * | 9/2000 | Chino et al. ............... 382/118 |
| 6,836,843 | B2 | * | 12/2004 | Seroussi et al. ............ 713/173 |
| 7,178,034 | B2 | | 2/2007 | Cihula et al. |
| 7,357,717 | B1 | | 4/2008 | Cumbers |
| 7,826,464 | B2 | | 11/2010 | Fedorov |
| 7,856,558 | B2 | | 12/2010 | Martin et al. |
| 7,979,902 | B2 | | 7/2011 | Chakra et al. |
| 8,325,995 | B1 | | 12/2012 | Bowers et al. |
| 2002/0114519 | A1 | | 8/2002 | Mastrianni et al. |
| 2007/0140532 | A1 | | 6/2007 | Goffin |
| 2007/0174272 | A1 | * | 7/2007 | Carter et al. ............... 707/5 |
| 2007/0198850 | A1 | * | 8/2007 | Martin et al. ............ 713/186 |
| 2008/0320015 | A1 | | 12/2008 | Mahdavi |
| 2009/0296997 | A1 | * | 12/2009 | Rocheford ............ 382/124 |
| 2010/0205667 | A1 | * | 8/2010 | Anderson et al. ........... 726/19 |
| 2011/0023113 | A1 | * | 1/2011 | Munyon et al. ............ 726/19 |
| 2011/0067098 | A1 | * | 3/2011 | Nelson et al. .............. 726/21 |
| 2011/0152726 | A1 | | 6/2011 | Cuddihy |
| 2011/0206244 | A1 | * | 8/2011 | Munoz-Bustamante ..... 382/118 |
| 2011/0252332 | A1 | * | 10/2011 | Lee et al. ................. 715/741 |
| 2012/0068858 | A1 | * | 3/2012 | Fredkin .................... 340/902 |

OTHER PUBLICATIONS

"Login", Wikipedia, the free encyclopedia, Aug. 18, 2010, 2 pages.

(Continued)

*Primary Examiner* — George Bugg
*Assistant Examiner* — Munear Akki
(74) *Attorney, Agent, or Firm* — Brake Hughes Bellermann LLP

(57) ABSTRACT

According to another general aspect, a method of managing a first user's use of an apparatus may include automatically detecting, via at least one sensor operably coupled with the apparatus a presence of the first user within a detection area, wherein the first user is authorized to use the apparatus. In various embodiments, the method may also include automatically detecting, via the at least one sensor, a change in the first user's status in relation to the apparatus. In some embodiments, the method may further include automatically adjusting, based upon the first user's status change, at least one authorization level of the first user, wherein the authorization level dictates, at least in part, how the first user may use the apparatus.

20 Claims, 13 Drawing Sheets

(56) References Cited

OTHER PUBLICATIONS

Non-Final Office Action for U.S. Appl. No. 13/165,387, mailed Nov. 3, 2011, 10 pages.
Non-Final Office Action for U.S. Appl. No. 13/246,854, mailed Nov. 3, 2011, 10 pages.
Non-Final Office Action Response for U.S. Appl. 13/165,387, filed Feb. 3, 2012, 16 pages.
Non-Final Office Action for U.S. Appl. No. 13/165,387, filed Mar. 9, 2012, 15 pages.
Non-Final Office Action for U.S. Appl. No. 13/246,854, filed Mar. 12, 2012, 17 pages.
Non-Final Office Action Response for U.S. Appl. No. 13/246,854, filed Feb. 3, 2012, 23 pages.
Final Office Action for U.S. Appl. No. 13/165,387, filed Aug. 2, 2012, 14 pages.
Notice of Allowance for U.S. Appl. No. 13/246,854, mailed Aug. 2, 2012, 18 pages.
Office Action Response and RCE for U.S. Appl. No. 13/165,387, filed Oct. 25, 2012, 15 pages.
"Providing limited access to supplicants who fail 802.1x authentication by configuring a guest VLAN on EX-series Ethernet switches", Juniper Networks, Aug. 2010, 2 pages.
Notice of Allowance for U.S. Appl. No. 13/165,387, mailed Apr. 4, 2014, 16 pages.

* cited by examiner

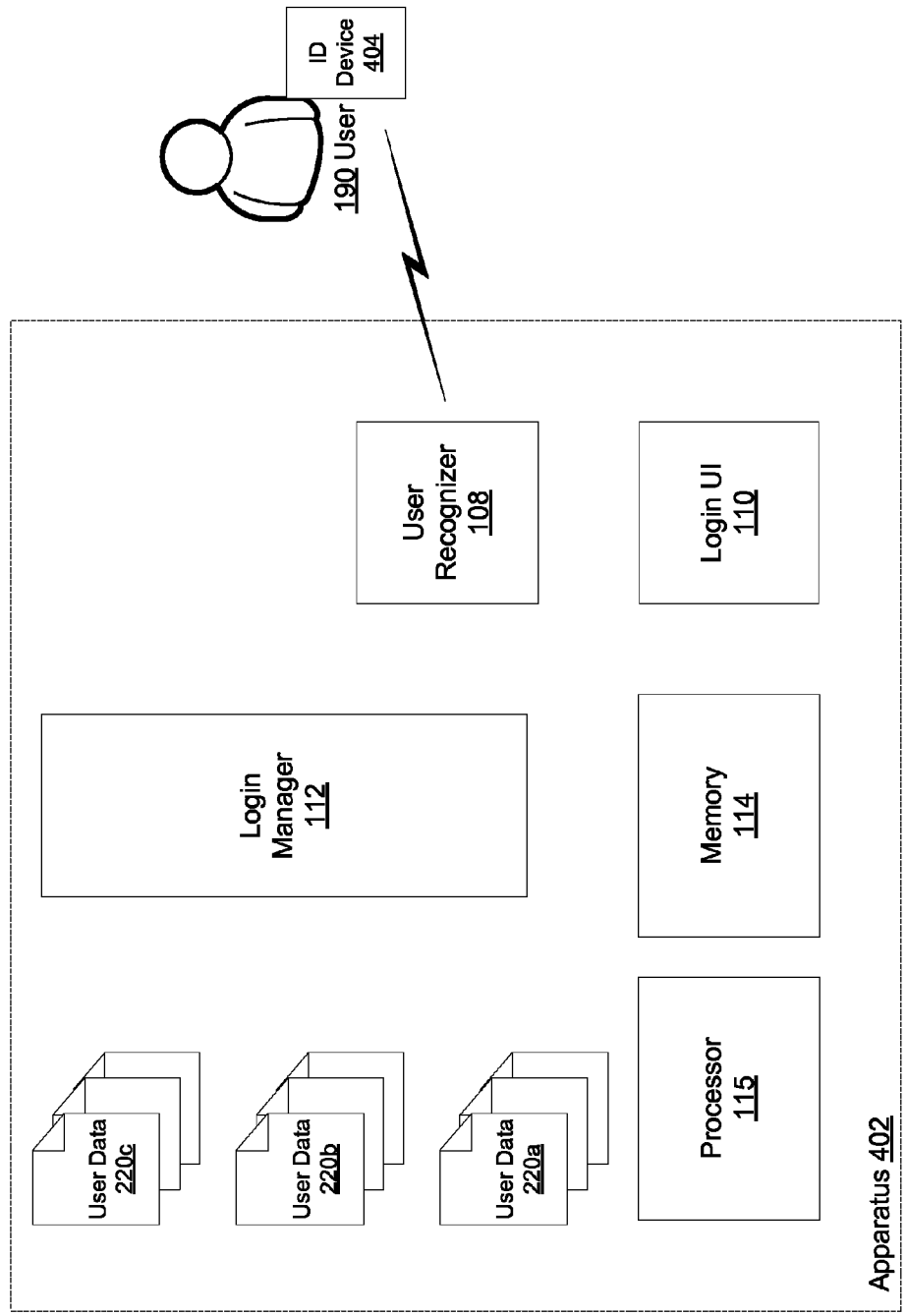

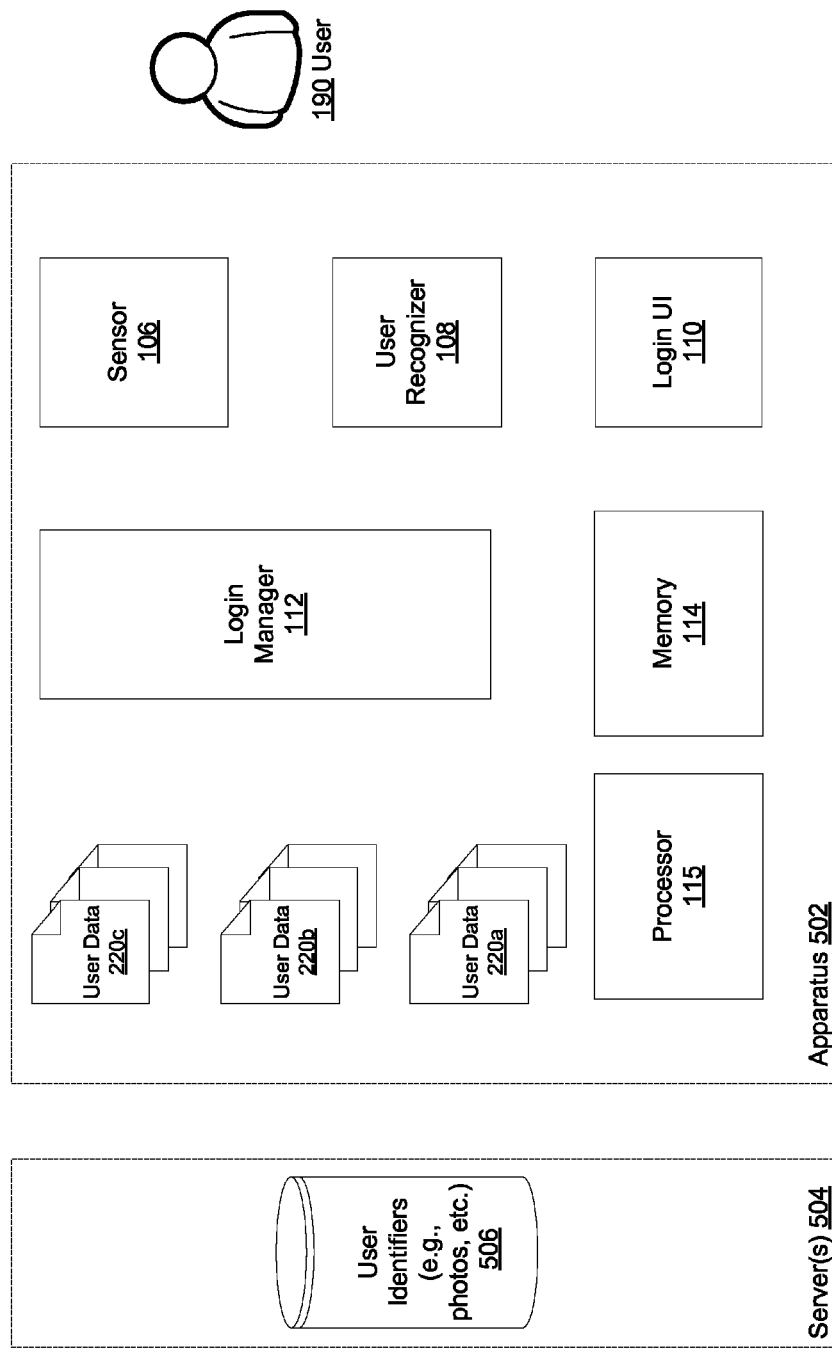

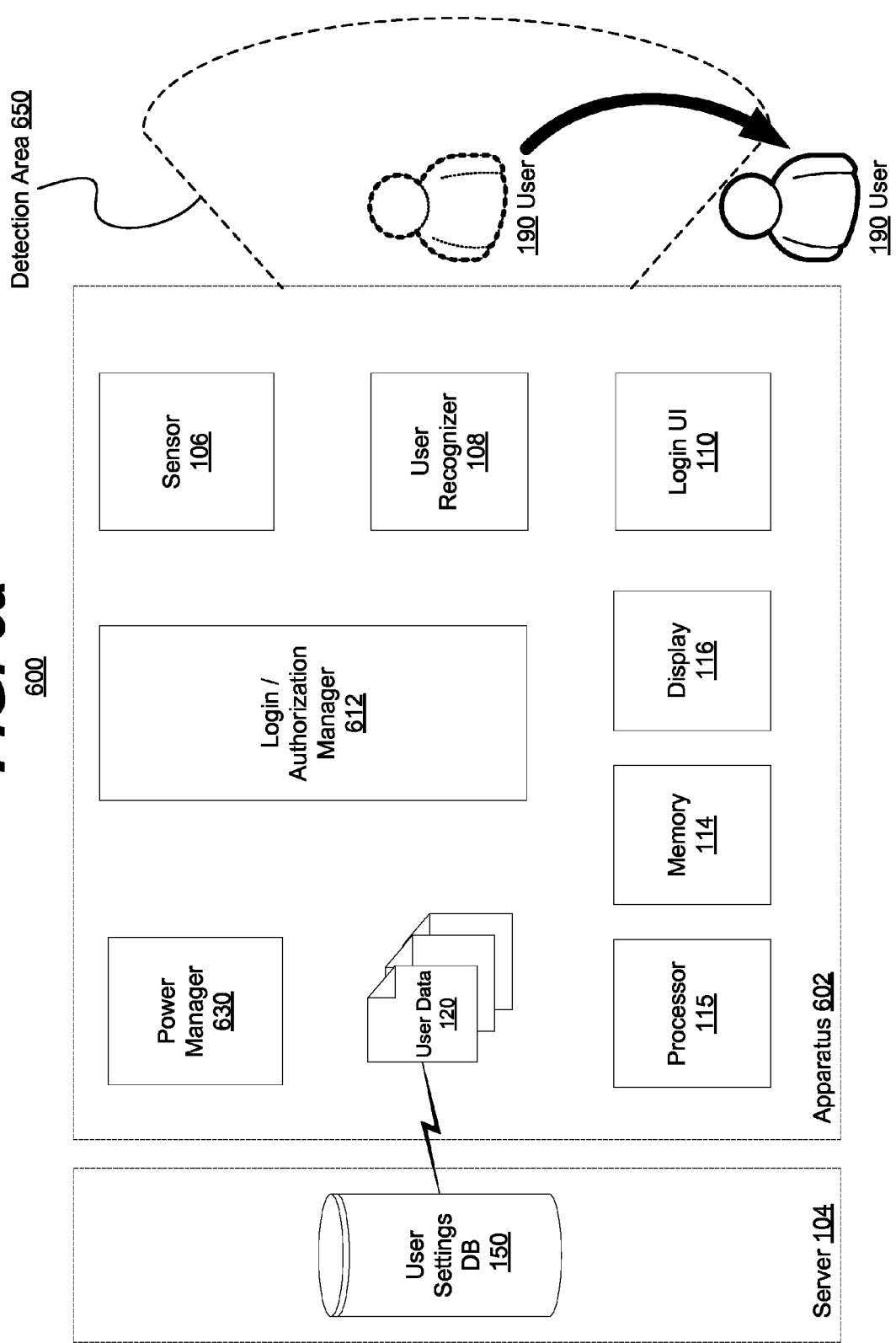

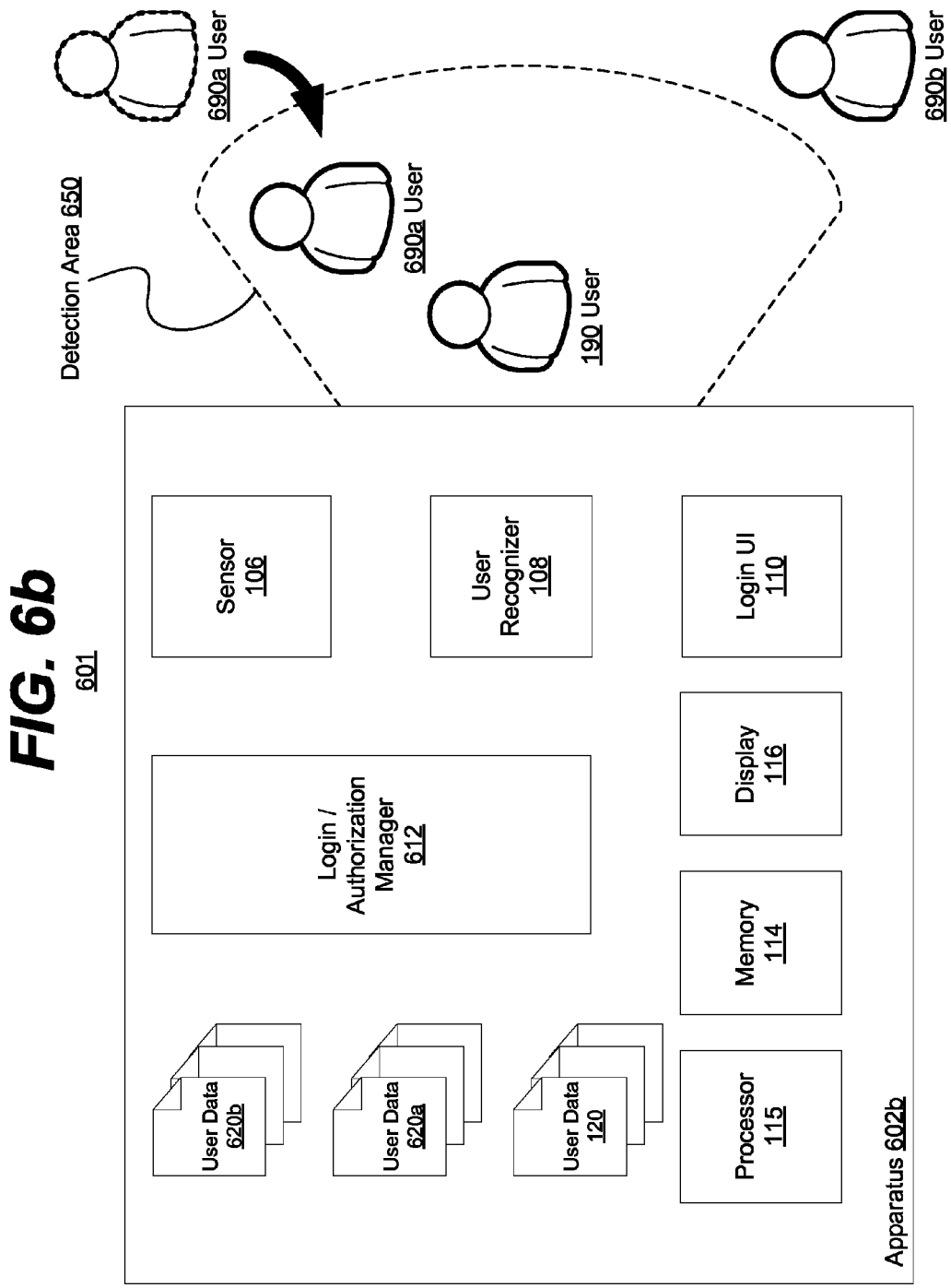

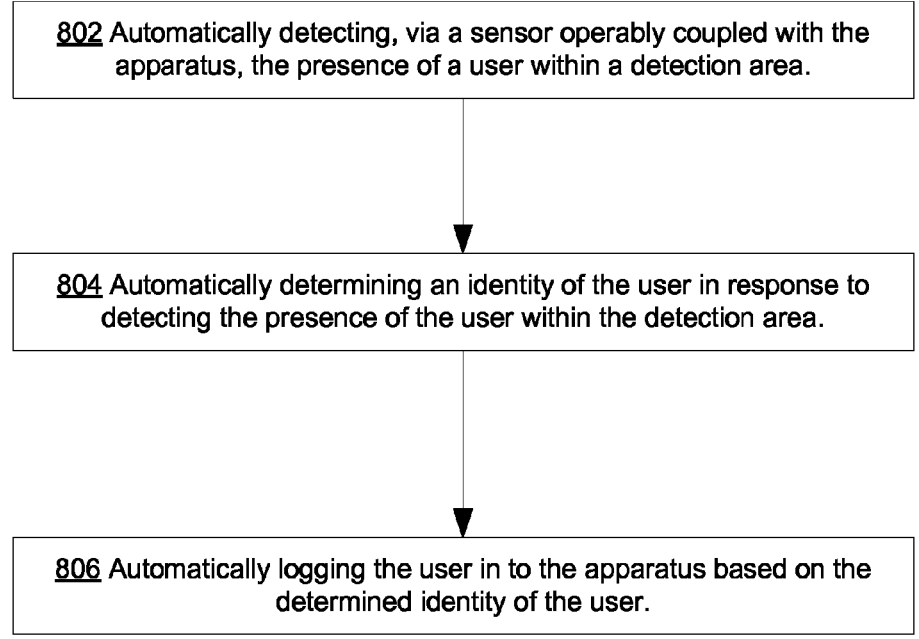

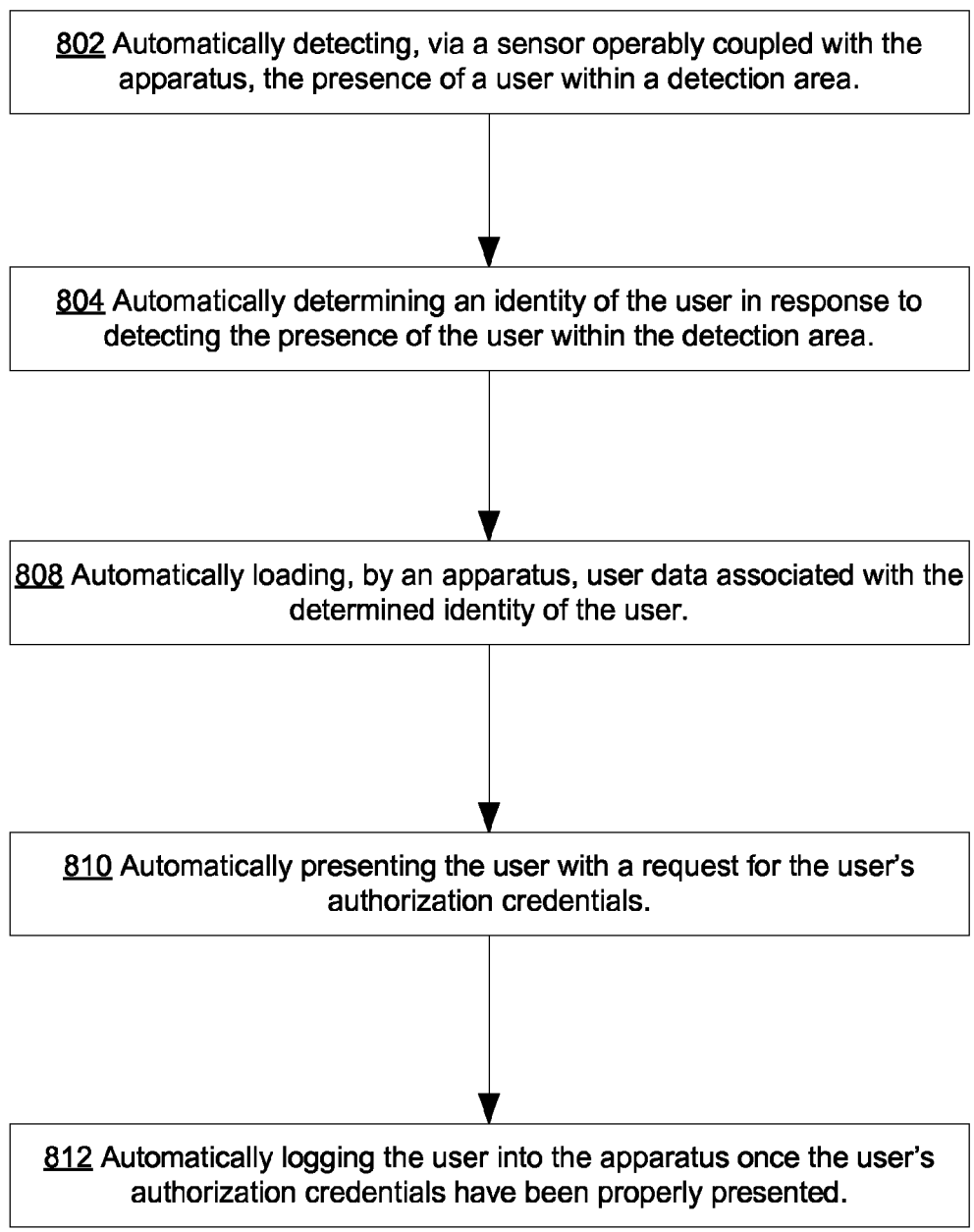

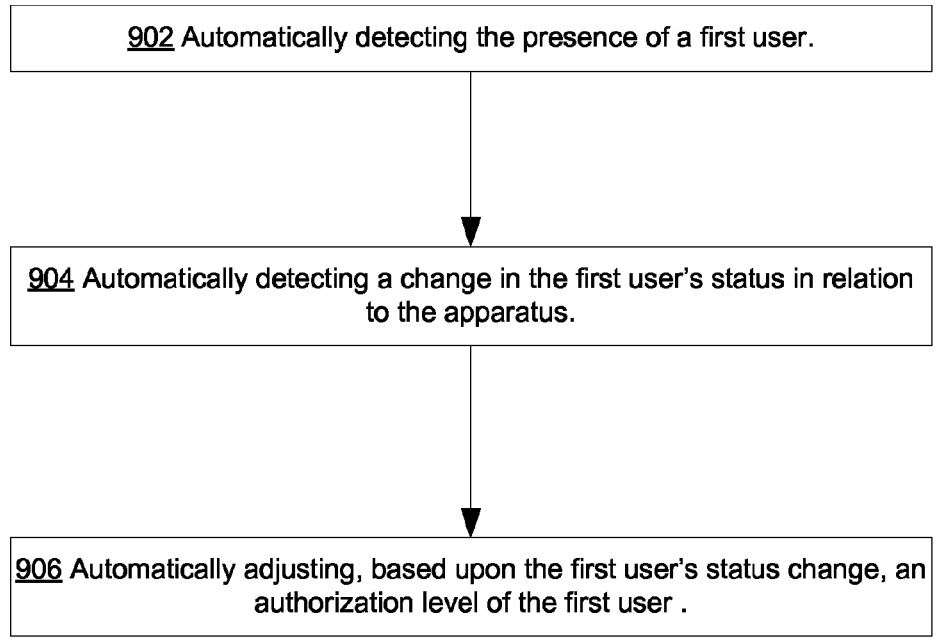

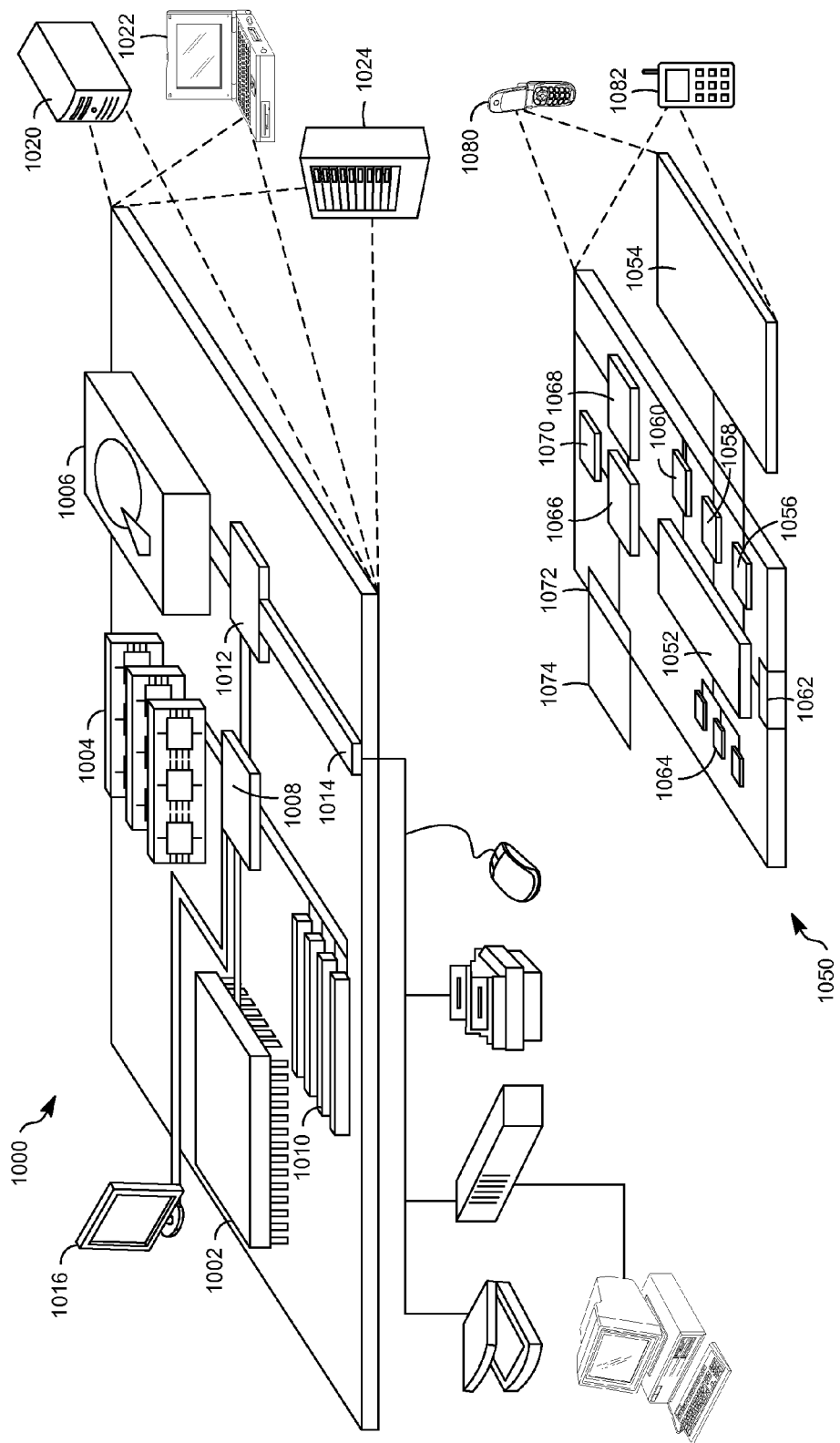

PROXIMITY WAKEUP

TECHNICAL FIELD

This description relates to authentication and more specifically to the automated authentication of a user on to a computer.

BACKGROUND

In computer security, a login or logon (also called logging in or on and signing in or on) is generally the process by which individual access to a computer system is controlled by identification of the user using security credentials provided by the user. A user can log in to a system to obtain access to the computer system and can then log out or log off (perform a logout/logoff) when the access is no longer needed. To log out is generally to close off one's access to a computer system after having previously logged in.

Traditionally, computers or electronic devices may be locked or otherwise secured to prevent unauthorized or inadvertent usage. Generally, a user is required to perform some affirmative action (e.g., enter a password, type a key combination, move the mouse, swipe a finger across the screen, etc.) to unlock the computer.

SUMMARY

According to one general aspect, a method of logging a user in to an apparatus may include automatically detecting, a sensor operably coupled with the apparatus, the presence of a user within a detection area. The method may also include automatically determining the identity of the user in response to detecting the presence of the user within the detection area. The method may further include automatically logging the identified user in to the apparatus based on the determined identity of the user.

According to one general aspect, a method may include automatically detecting, via a sensor operably coupled with the apparatus, the presence of a user within a detection area. The method may also include determining the identity of the user in response to detecting the presence of the user within the detection area. The method may further include automatically loading, by the apparatus, user data associated with the determined identity of the user. The method may also include automatically presenting the user with a request for the user's authentication credentials.

According to another general aspect, an apparatus may include a sensor and a processor. The sensor may be configured to automatically detect the presence of a user within a detection area. The processor may be configured to automatically determine the identity of the user in response to the sensor detecting the presence of the user within the detection area. The processor may be configured to automatically log the identified user in to the apparatus based on the determined identity of the user.

According to another general aspect, a computer program product for authenticating a user may exist. The computer program product may be tangibly embodied on a computer-readable medium and include executable code that, when executed, is configured to cause an apparatus to: automatically detect, via a sensor operably coupled with the apparatus, the presence of a user within a detection area; determine the identity of the detected user in response to detecting the presence of the user within the detection area; and automatically log the identified user in to the apparatus based on the determined identity of the user.

According to another general aspect, a method of managing a first user's use of an apparatus may include automatically detecting, via at least one sensor operably coupled with the apparatus a presence of the first user within a detection area, wherein the first user is authorized to use the apparatus. In various embodiments, the method may also include automatically detecting, via the at least one sensor, a change in the first user's status in relation to the apparatus. In some embodiments, the method may further include automatically adjusting, based upon the first user's status change, at least one authorization level of the first user, wherein the authorization level dictates, at least in part, how the first user may use the apparatus.

According to another general aspect, an apparatus may include at least one sensor to automatically detect a presence of a first user within a detection area, wherein the first user is authorized to use the apparatus. The apparatus may also include a processor that is operably coupled to the sensor and to automatically detect, via the sensor, a change in the first user's status in relation to the apparatus, and automatically adjust, based upon the first user's status change, at least one authorization level of the first user, wherein the authorization level dictates, at least in part, how the first user may use the apparatus.

According to another general aspect, a computer-readable medium being tangibly embodied and including executable code that causes an apparatus to automatically detect, via at least one sensor operably coupled with the apparatus, a presence of the first user, wherein the first user is authorized to use the apparatus. In some embodiments, the code may also cause the apparatus to automatically detect, via the at least one sensor and within the detection area, a change in the first user's status in relation to the apparatus. In various embodiments, the code may further cause the apparatus to automatically adjust, based upon the first user's status change, at least one authorization level of the first user, wherein the authorization level dictates, at least in part, how the first user may use the apparatus.

The details of one or more implementations are set forth in the accompanying drawings and the description below. Other features will be apparent from the description and drawings, and from the claims.

A system and/or method for managing user authentication, substantially as shown in and/or described in connection with at least one of the figures, as set forth more completely in the claims.

BRIEF DESCRIPTION OF THE DRAWINGS

FIG. 4 is a block diagram of an example embodiment of a system in accordance with the disclosed subject matter.

FIG. 5 is a block diagram of an example embodiment of a system in accordance with the disclosed subject matter.

FIG. 6a is a block diagram of an example embodiment of a system in accordance with the disclosed subject matter.

FIG. 6b is a block diagram of an example embodiment of a system in accordance with the disclosed subject matter.

FIG. 8a is a flowchart of an example embodiment of a technique in accordance with the disclosed subject matter.

FIG. 8b is a flowchart of an example embodiment of a technique in accordance with the disclosed subject matter.

FIG. 9 is a flowchart of an example embodiment of a technique in accordance with the disclosed subject matter.

FIG. 10 shows an example of a computer device and a mobile computer device that can be used to implement the techniques described here.

Like reference symbols in the various drawings indicate like elements.

DETAILED DESCRIPTION

Figure 1:
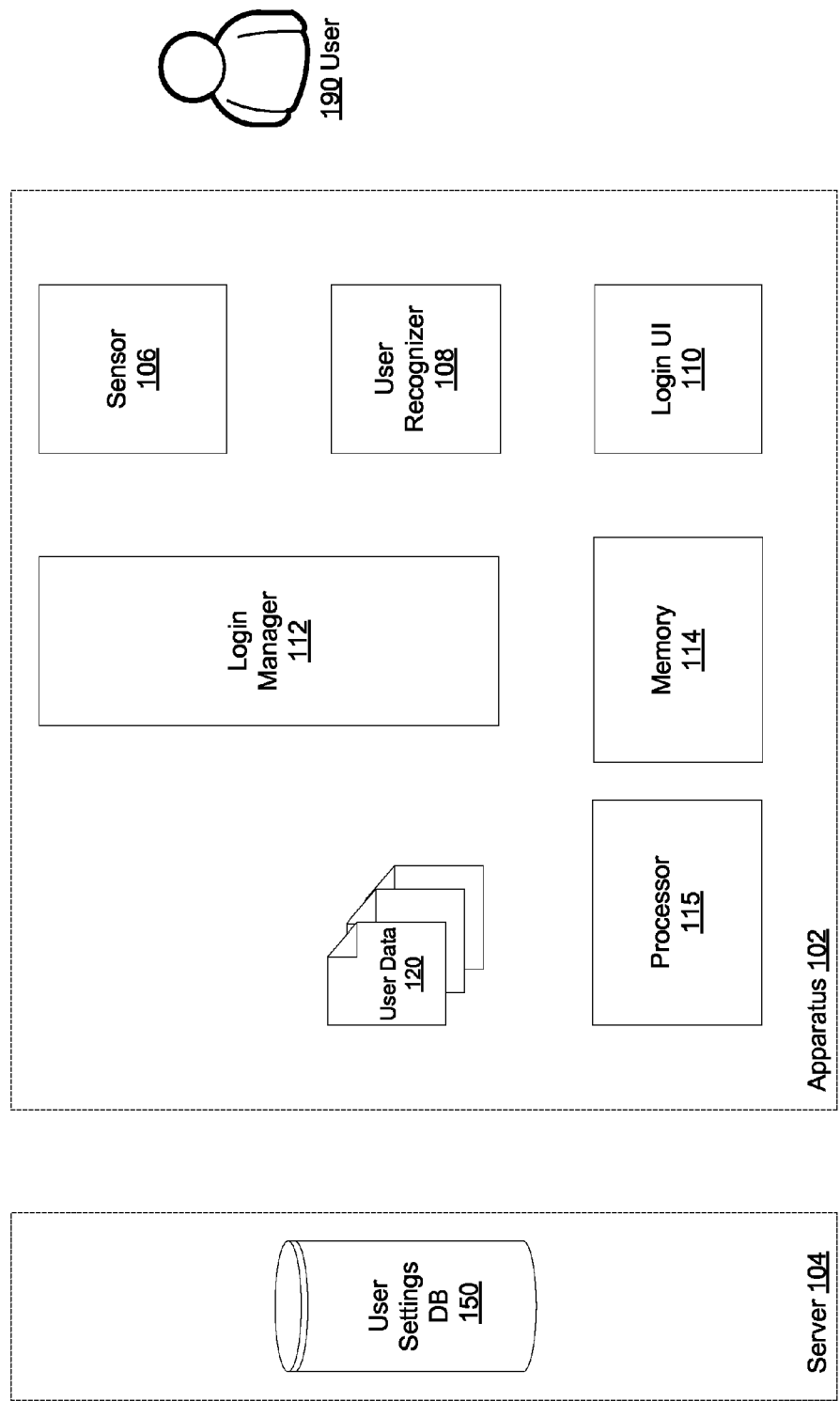
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include an apparatus, electronic device, or computer 102, and a server 104. The electronic device 102 may include a desktop computer, a laptop, a tablet, a netbook, a smartphone, etc. This apparatus 102 may be used by a user 190.

FIG. 1 illustrates an apparatus 102 and system 100 which may be used in an illustrative example. In one illustrative embodiment, as a user (e.g., user 190) approaches the apparatus 102, a sensor (e.g., a proximity sensor) may wake up the processor and a camera or other sensor. The processor may cause the camera to take a digital image of the user. The processor or user recognizer module executing on the processor may analyze the digital image of the user to determine which user, out of a number of possible users, is approaching the apparatus 102. For example, the processor may compare the distance between the user's eyes and a similar eye distance of the potential users. Once the proper user has been identified, the processor or a login manager module executing on the processor may load the identified user's user data and log the user onto the apparatus 102.

In the illustrated embodiment of FIG. 1, the user data 120 may be retrieved from a server 104 the houses a user settings database 150. In such an embodiment, a user 190 may use a plurality of devices (e.g., apparatus 102, etc.) and their user data 120 may be available regardless of which device is used. Once the apparatus 102 has identified the user 190, the apparatus 102 may request and subsequently download the user 190's user data 120 from the server 104. The apparatus 102 may subsequently automatically log the user 190 into the apparatus 102 using the user data 120. It is understood that the above are merely a few illustrative examples to which the disclosed subject matter is not limited.

In various embodiments, the electronic device 102 may include a processor 115 and a memory 114. In some embodiments, the processor 115 may execute various software modules, firmware modules, or a combination thereof. For example, in one embodiment, the processor 115 may execute a login manager 112, a user recognizer 108, and/or the login user interface 110. In such an embodiment, portions of the executed modules may be stored within the memory 114.

In one embodiment, the electronic device 102 may be in a dormant state. Such a dormant state may include a state or mode in which no user (e.g., user 190) is logged in to the device 102, or a low power mode such as a sleep mode or hibernation mode in which the device's 102 components or a portion thereof are powered off or down and most operating state is saved to the device's 102 memory 114, either volatile memory (e.g., for sleep mode) or non-volatile memory (e.g., for hibernation mode). Although, it is understood that the above are merely a few illustrative examples to which the disclosed subject matter is not limited.

A user 190 may approach the electronic device 102. The device 102 may, in one embodiment, be configured to detect the presence of the user 190. In various embodiments, the device 102 may include a proximity sensor 106 which is configured to detect the presence of a user (e.g., user 190). It is understood that the above is merely an example to which the disclosed subject matter is not limited. In a low power mode this proximity sensor or other detection sensor or module 106 may be powered on or up, despite the majority of the device 102 being in a low power mode, in order to detect a user. In various embodiments, the sensor 106 may include a touchpad, mouse, capacitive sensor, conductive sensor, etc. configured to sense the user 190 (e.g., via touch, etc.).

In one embodiment, the device 102 may include a user recognizer 108 configured to, upon the detection of the user 190, determine the identity of the user 190. The user recognizer 108 may include a camera or other sensor (e.g., infrared, etc.). It is understood that the above are merely a few illustrative examples to which the disclosed subject matter is not limited.

In various embodiments, the user recognizer 108 may compare the sensor reading of the user 190 (e.g., a captured digital image, etc.) to a list of possible users. The user recognizer 108 may select a user from among the list of potential users that most closely matches the detected user 190. Although, in some embodiments, the user recognizer 108 may be configured to select none of the potential users if a sufficiently close match for the detected user 190 is not made, wherein the sufficiency of the match is judged by predefined criteria.

In such a situation in which no potential user matches the detected user 190, the apparatus 102 may not log any user in to the apparatus 102. Refraining from logging the detected user 190 in to the apparatus 102 may include not removing the apparatus 102 from the low power state, if the apparatus 102 is in such a state. In another embodiment, the apparatus 102 may load a set of default user settings, preferences or data 120, either in whole or in part. In one embodiment, the apparatus 102 may load a set of guest user settings. In such an embodiment, the guest user settings may provide no or a limited access to data stored on the apparatus 102. In such an embodiment, the guest user settings may provide access to the Internet or provide an otherwise limited and restricted access to the apparatus 102 and the capabilities of the apparatus 102.

In various embodiments, the user recognizer 108 may perform facial recognition on the sensor reading. In such an embodiment, the user recognizer 108 may compare the facial features of the user 190, as detected by a sensor of the user recognizer 108 or apparatus 102, against the facial features of a group of potential users. The comparison may include a comparison of other body features (e.g., height, body temperature, etc.). For example, the apparatus 102 may calculate the user 190's height based upon a digital image captured by a camera. In another example, the apparatus 102 may calculate the distance between the user 190's eyes or other biometric feature (e.g., eigenface analysis, etc.). It is understood that the above are merely a few illustrative examples to which the disclosed subject matter is not limited.

In one embodiment, the device 102 may include a login manager 112 configured to access a given user's settings, preferences, etc. (collectively referred to as user data 120) and load them into the memory 114 of the device 102 or otherwise perform the operations to gain access or login to the device 102. In various embodiments, the user data 120 may include data instructing the apparatus to, for example: mount various network drives, printers, and/or devices; establish various network connections; set a certain color scheme or graphical user interface (GUI) theme; load bookmarks or file and icon settings; volume and multimedia settings; saved passwords or authentication credentials; etc.; It is understood that the above are merely a few illustrative examples to which the disclosed subject matter is not limited.

In another embodiment, the user data 120 may include a list of applications, documents, files, or tabs which are to be opened or executed when the user 190 is logged into the apparatus 102. In some embodiments, these applications, documents, files, or tabs may have been open or actively executed when the user 190 was previously logged into such an apparatus 102. In such an embodiment, this user data 120 may allow or facilitate a user 190 to synchronize their working environment across multiple machines or apparatuses.

In various embodiments, the login manager 112 may acquire the user data 120 from a remote server 104 that stores the user data 120 in a user settings database (DB) 150. In such an embodiment, the remote server 104 may be configured to synchronize the user data 120 across a plurality of devices (e.g., apparatus 102, etc.), as described above. In various embodiments, the login manager 112 may be configured to update the remote server 104 or the user settings database (DB) 150 with any changes to the user data 120 that occur while the user 190 is logged in to the apparatus 102.

In some embodiments, the login process may require a password or other security credentials that entail an active involvement from the user 190. In such an embodiment, the device 102 may include a login user interface (UI) 110 configured to prompt the user 190 for their authorization credentials (e.g., password, etc.). The login manager 112 may speculatively load the user's user data 120 in anticipation of the proper presentation of the authorization or security credentials. In another embodiment, the presentation of security credentials may occur in an automated way wherein the login manager 112 may automatically detect and present the security credentials (e.g., a facial recognition match, a broadcast security token, etc.).

Figure 2:
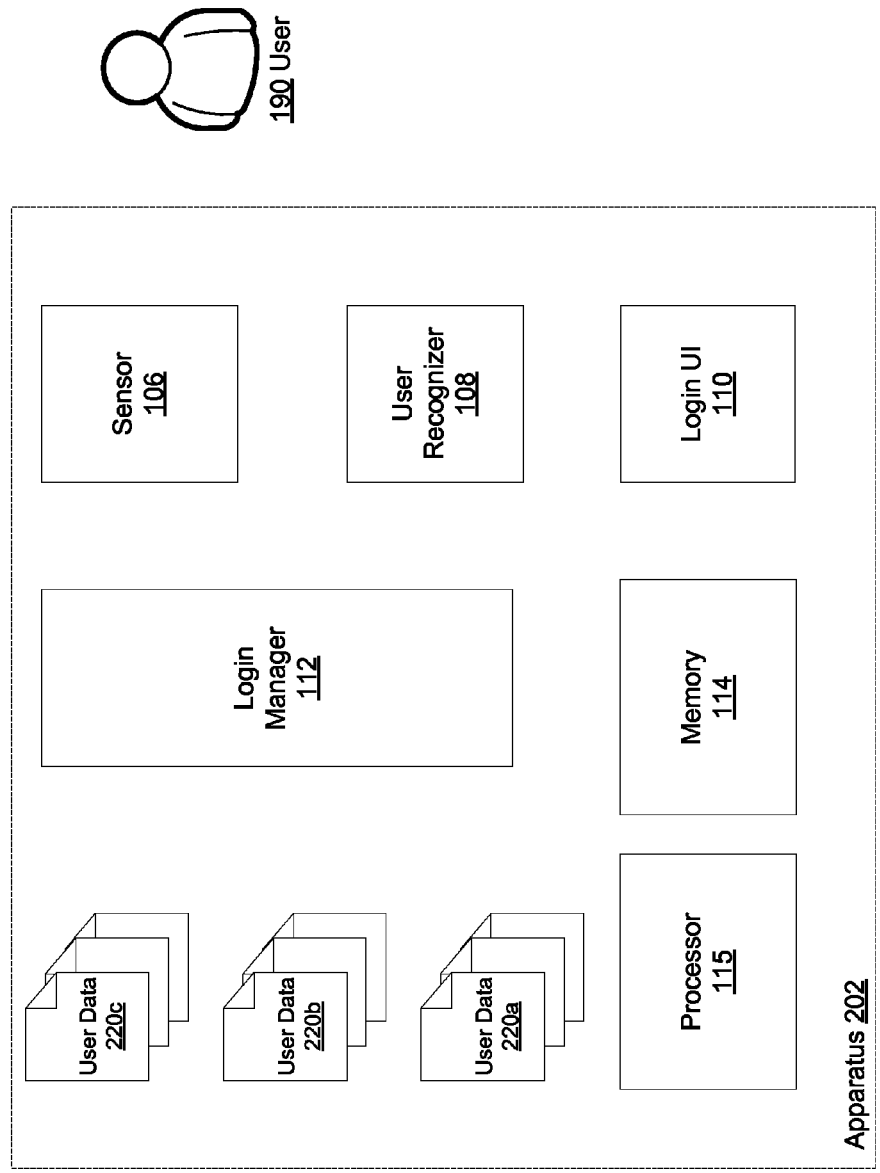
FIG. 2 is a block diagram of an example embodiment of an apparatus in accordance with the disclosed subject matter.

FIG. 2 is a block diagram of an example embodiment of an apparatus 202 in accordance with the disclosed subject matter. In one embodiment, the apparatus, electronic device, or computer 202 may include a desktop computer, a laptop, a tablet, a netbook, a smartphone, etc.

In one embodiment, the apparatus 202 may be similar to the apparatus 102 of FIG. 1, except that a plurality of user data, each associated with a respective different user (e.g., user data 220a, 220b, and 220c, etc.), may be stored locally within the device 202. The user recognizer 108 may select or attempt to recognize the user 190 from among the users associated with the user data 220a, 220b, and 220c. In such an embodiment, the plurality of user data may include data that may be employed to identify the detected user 190 (e.g., facial feature patterns, a photograph of the user 190, etc.).

In various embodiments, if none of the user data is associated with the detected user 190, the login manager 112 may not pre-load or log user 190 in to the device 202, as described above. In one embodiment, the login UI 110 may be present or display to the user 190 a default log in screen or UI. Upon manually logging in to the apparatus 202, the login manager 112 may create a new user data set for user 190.

In one embodiment, the creation of a new user data set may be predicated upon user consent. In some implementations, a user can be prompted to explicitly allow the creation of the user data set and any data collection (e.g., storing the user data on a server 104, etc.). Further, the user may opt in/out of participating in such data collection activities. Furthermore, the collected data can be anonymized prior to performing data analysis, for example, to create a generic set of user data which may be employed to create a new user data set.

Alternatively, the login manager 112 may request a set of user data associated with the user 190 from a remote server upon which the user's 190 data is stored. The user's 190 data may be added to the locally stored set of user data (e.g., user data 220a, 220b, and 220c, etc.) and be employed in subsequent instances in which the user 190 attempts to be automatically logged in to the apparatus 202.

In some embodiments, a combination of the devices 102 and 202 of FIGS. 1 and 2, respectively, may exist. In such an embodiment, some user data may be stored locally while others may be stored remotely. Alternately, a first portion of a user data (e.g., icon placement, color schemes, etc.) may be stored locally and a second portion of the user data (e.g., active tabs, printer settings, drive mappings, etc.) may be stored remotely and even synchronized between various devices the user may make use of. It is understood that the above are merely a few illustrative examples to which the disclosed subject matter is not limited.

Figure 3:
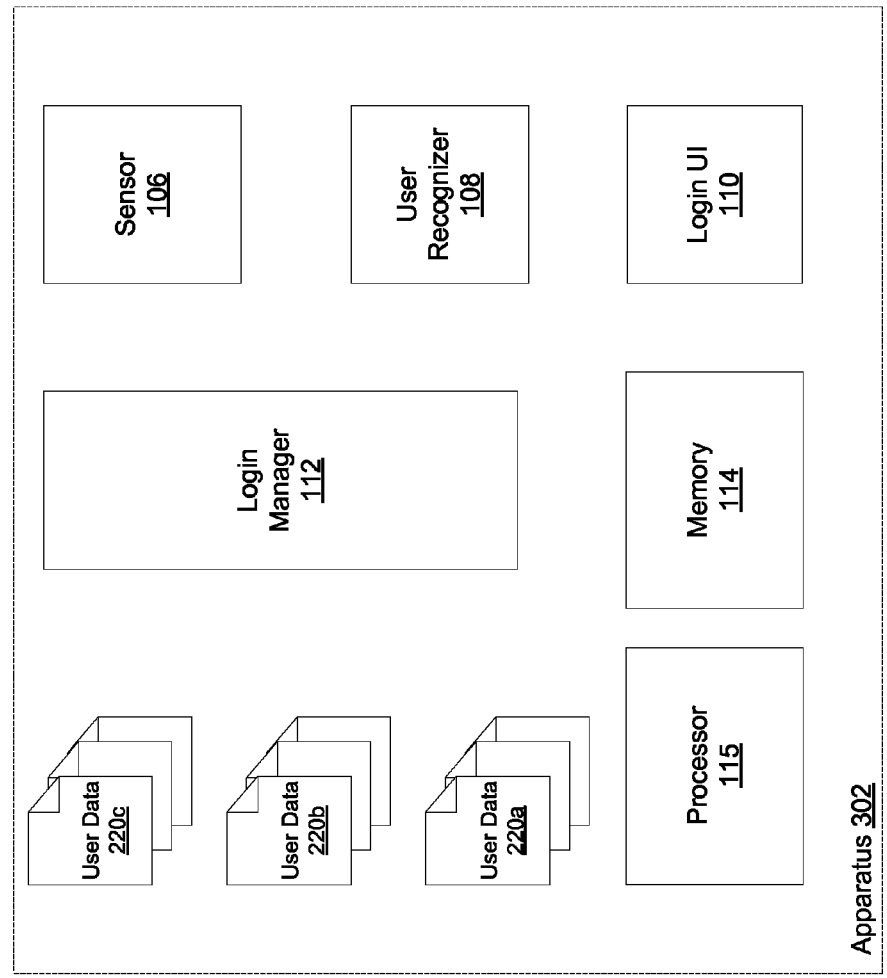
FIG. 3 is a block diagram of an example embodiment of a system in accordance with the disclosed subject matter.

FIG. 3 is a block diagram of an example embodiment of a system 300 in accordance with the disclosed subject matter. In one embodiment, the system 300 may include an apparatus, electronic device, or computer 302. The electronic device 302 may include a desktop computer, a laptop, a tablet, a netbook, a smartphone, etc.

Again the apparatus 302 may be similar to the apparatus 202 of FIG. 2. However, in FIG. 3, it is shown that, in one embodiment, the user recognizer 108 may be configured to select a single user (e.g., user 190) from among a plurality of possible or potential users (e.g., users 390a and 390b) that are within the sensor range of the sensor 106 or the user recognizer 108.

In the illustrated embodiment, the apparatus 302 may include a shared computer that is used by a family of users within a household. In another embodiment, the apparatus 302 may be a shared computer in a workplace environment that is used by a number of employees. In such an embodiment, the apparatus 302 may detect more than one potential user and select one of the potential users to login to the apparatus 302. It is understood that the above are merely a few illustrative examples to which the disclosed subject matter is not limited.

In one such embodiment, the user recognizer 108 may be configured to identify the user 190 closest to the device 302. In another embodiment, the user recognizer 108 may be configured to associate the apparatus 202 with a primary user (e.g., user 190) that is preferred or the primary user for the apparatus 202. This primary user may be selected to be logged in, if the primary user is among the plurality of potential users. In various embodiments, the user recognizer 108 may be configured to selecting one user from the plurality of potential users based upon a predefined set of criteria. It is understood that the above are merely a few illustrative examples to which the disclosed subject matter is not limited.

In various embodiments, the identification of the user 190 may be based upon user habits. For example, a first user (e.g., user 190) may log into the apparatus 302 most often during certain periods of time (e.g., 8:00 pm to 10:00 pm). A second user (e.g., user 390a) may log into the apparatus 302 most often during a second period of time (e.g., 9:00 am to 1:00 pm). And, the third user (e.g., user 390b) may log into the apparatus 302 most often during a third period of time (e.g., 2:30 pm to 5:30 pm). Based upon these habits of the users 190, 390a, and 390b, the apparatus 302 may identify which of the potential and detected users to select as the primary user. Other user habits (e.g., based upon location, most recently used, frequency of use, etc.) may be employed by the apparatus 302 to select a user. It is also understood that such a user habit based identification technique may be employed when only a single user is identified. In such an embodiment, user habits may provide for a number of likely candidate users and reduce (at least initially) the number of user candidates the apparatus 302 may attempt to match against the detected user. It is understood that the above are merely a few illustrative examples to which the disclosed subject matter is not limited.

FIG. 4 is a block diagram of an example embodiment of a system 400 in accordance with the disclosed subject matter. In one embodiment, the system 400 may include an apparatus, electronic device, or computer 402. The electronic device 402 may include a desktop computer, a laptop, a tablet, a netbook, a smartphone, etc.

In the illustrated embodiment, the apparatus 402 may include a computer in a workplace environment. In various embodiments, the apparatus 102 may be shared by a number of users or, alternately, designated to be used by a primary user. In the illustrated embodiment, instead of a camera or other independent sensor, the apparatus 402 may be configured to base its identification of the user on an identifying device (e.g., an employee badge, etc.). In another embodiment, a user may have paired or otherwise associated a device (e.g., a smartphone, etc.) with the apparatus 402. In such an embodiment, the associated device may serve to identify the user to the apparatus 402.

In the illustrated embodiment, as the user or the user's identification device (e.g., employee badge, smartphone, a Bluetooth earpiece, etc.) approaches the apparatus 402, the user recognizer or processor may detect the identification device and, based upon the user associated with the identification device, automatically log the user into the apparatus 402. It is understood that the above are merely a few illustrative examples to which the disclosed subject matter is not limited.

The apparatus 402 may employ an identification (ID) device 404 to recognize the user 190. In various embodiments, the ID device 404 may include a badge, a card, a security token, a phone, or other electronic device, etc., although it is understood that the above are merely a few illustrative examples to which the disclosed subject matter is not limited. The ID device 404 may, in various embodiments, be configured to be an item which the user 190 may comfortably carry with them on a regular basis.

In one embodiment, the user recognizer 108 or a sensor (e.g., like sensor 106 of FIG. 1, etc.) may be configured to receive a signal or other identifier from the ID device 404. The ID device 404 may communicate with the apparatus 402 via a short range communication protocol (e.g., Bluetooth, Radio Frequency Identifier (RFID), etc.), a medium range protocol (e.g., Wi-Fi, wireless local area network (WLAN), etc.) or a longer range protocol (e.g., cellular, text message, etc.). The ID device 404 may transmit a message or signal that includes an identification of the user 190 associated with the ID device 404. Such identifiers may include an email address, a username, an encrypted code, a phone number, etc.

In one embodiment, the ID device 404 may be configured to provide the apparatus 402 with a gateway or access point to a communications network (e.g., cellular data tethering, etc.). As part of such tethering or a network handover process the ID device 404 may provide the apparatus 402 with an identifier associated with user 190. Based upon the user 190 associated with the ID device 404 the apparatus 402 may login the recognized user 190, either fully or partially, as described above.

FIG. 5 is a block diagram of an example embodiment of a system 500 in accordance with the disclosed subject matter. In one embodiment, the system 500 may include an apparatus, electronic device, or computer 502, and a server 504. The electronic device 502 may include a desktop computer, a laptop, a tablet, a netbook, a smartphone, etc.

The illustrated embodiment, illustrates another means by which the apparatus 502 may identify the user 190. As described above in regard to FIGS. 1, 2, 3, and 4, the apparatus may identify the user based upon criteria (e.g., biometric information, an identifier, etc.) that are locally available (e.g., stored within the apparatus, stored within the identification device, etc.) or stored within a repository (e.g., server 104, etc.). In the illustrated embodiment, the identifying information may be found in a remote storage system. In various embodiments, the identifying information may be stored in a distributed fashion (e.g., a social media site, a photo sharing site, etc.).

In one embodiment, the user recognizer 108 may be configured to utilize user identifiers 506 stored within one or more servers 504 to recognize the detected user 190. Examples of user identifiers 506 may include photos, etc. from servers 504 or sites associated with the user 190. For example, the user recognizer 108 may be configured to check a company directory, social media site, or photo sharing site associated with a possible user or defined in a predetermined setting. The user recognizer 108 may compare photos found on the server(s) 504 with the sensor reading or a photo taken of user 190 while user 190 is waiting to be logged into the device 502. In various embodiments, the user recognizer 108 may be configured to only check a limited list of possible users (e.g., users who have previously logged into the device 502, users within a company, etc.).

In various embodiments, other forms of user identifiers 506 may include email addresses, phone numbers, etc.; it is understood that the above are merely a few illustrative examples to which the disclosed subject matter is not limited. In some embodiments, the user identifier features 506 of system 500 may be combined with the ID device 404 of FIG. 4. In such an embodiment, the identification information provided by the ID device 404 may be used as part of a query to a server(s) 504 housing user identifiers 506. It is understood that the example of the combination of systems 400 and 500 is merely one example to which the disclosed subject matter is not limited, and that the combination of any features herein described in regards to the various figures or in the claims may be combined and are within the disclosed subject matter.

FIG. 6a is a block diagram of an example embodiment of a system 600 in accordance with the disclosed subject matter. In one embodiment, the system 600 may include an apparatus 602 used by a user 190, and a server 104. As described above, the apparatus 602 may include a processor 115, a memory 114, one or more sensors 106, a login user interface 110, and a user recognizer 108. In addition, in various embodiments, the apparatus 602 may include a display or monitor 116 configured to graphically display information to the user 190.

In various embodiments, the sensor 106 may include or have a detection area 650 in which the sensor 106 is configured to sense or operate. For example, in the case of an optical visible light camera 106 embedded in the top of the display 116, the camera may have a field of vision, or more generally a "detection area 650", in front of the display 116 in a circular arc radiating, for example, approximately 2 meters from the camera 106. Therefore, the camera 106 may not be configured to detect things outside the camera 106's detection area 650 (e.g., things behind the display 116, etc.). In various embodiments, if multiple sensors 106 are used, each sensor 106 may have its own respective detection area 650. It is understood that the above is merely one illustrative example to which the disclosed subject matter is not limited.

In the illustrated embodiment, the user 190 may have already been detected and logged into the apparatus 602, as described above. As such, the user 190's user data 120 may have been loaded into the memory 114 or otherwise made available to the apparatus 602 as part of the logging in process, as described above. In some embodiments, the user data 120 may have been altered or edited as part of the user 190's use of the apparatus 602. For example, the user 190 may have opened or closed various documents or tabs, changed configuration settings (e.g., email servers, network settings, etc.) or other forms of user data 120.

In the illustrated embodiment, the user 190 may leave the sensor 106's detection area 650. The sensor 106 or apparatus 602 may detect this change in the user 190's status in regards to the apparatus 602. In this context, a "change in user status" may include a change in the user's presence (e.g., has the user walked away from the apparatus?, etc.), a change in the user's sole or shared use of the apparatus (e.g., does the user have sole access to the apparatus?, are multiple user's sharing the apparatus?, is a second individual or user able to eavesdrop or spy on the logged in user?, etc.), or a change in the user's attentiveness to the apparatus 602 (e.g., is the user actively using the apparatus 602 or merely in the sensor's detection area?, etc.), etc. It is understood that the above are merely a few illustrative examples to which the disclosed subject matter is not limited.

In the illustrated embodiment, the user 190 may leave the detection area 650 of the sensor 106. For example, the user 190 may walk away from the apparatus 602. In such an embodiment, the sensor 106 or user recognizer 108 may detect this change in status of the user 190's relationship with the apparatus 650, as described above. In response to this change in the user 190's status, the login/authorization manager 612 may adjust the authorization level of the user 190.

For example, in one embodiment, the login/authorization manager 612 may log the user 190 out of the apparatus 602. In this context, logging the user 190 out of the apparatus 602 may be considered a way to adjust the user 190's authorization to use the apparatus 602. In such an embodiment, this may include updating or synchronizing the user 190's user data 120 with the server 104. In such an embodiment, when the user 190 logs back into an apparatus (e.g., apparatus 602 or another apparatus, etc.) the updated user data 120 may be employed to log the user 190 into the apparatus device. In the embodiment in which the user 190's open applications, documents, etc. are included in the user data 120, the user 190 may be able to continue using the apparatus 602 (or other apparatus) essentially as if the user 190 had never been logged out. It is understood that the above is merely one illustrative example to which the disclosed subject matter is not limited.

In another embodiment, the login/authorization manager 612 may partially log the user 190 out of the apparatus 602. Again, in this context, partially logging the user 190 out of the apparatus 602 may be considered a way to adjust the user 190's authorization to use the apparatus 602. For example, the login UI 110 could remove the normal graphical information displayed via the display 116 (e.g., windows, documents, etc.) and instead display a login or a lock screen that requires the user 190 to re-authenticate themselves before the normal graphical information may be displayed via the display 116. In such an embodiment, the user data 120 may or may not be synchronized with the server 104, depending upon the embodiment. In various embodiments, the re-authentication may occur automatically via the techniques described above in reference to FIGS. 1, 2, 3, 4, and/or 5.

In another embodiment, the login/authorization manager 612 may place or transition the apparatus 602 to a reduced power state (e.g., the suspend power state, the hibernate power state, etc.). In this context, placing the apparatus 602 in a reduced power state may be considered adjusting the user 190's authorization to use the apparatus 602, as the user 190 may be limited in how they may use the apparatus 602 when the apparatus 602 is in the reduced power state. In various embodiments, the login/authorization manager 612 may place or transition a portion of the apparatus 602 to a reduced power state. For example, the login/authorization manager 612 may turn off or reduce the brightness of the display 116 if the user 190 is not within the detection zone 650 or otherwise has a status in relation to the apparatus 602 in which it is unlikely that the user 190 will be looking at the display 116 (e.g., the user 190's back may be towards the apparatus 602, etc.). In various embodiments, the apparatus 602 may include a power manager 630 which manages the transition of the apparatus 602 to and from various power modes. In such an embodiment, the login/authorization manager 612 may request that the power manager 630 perform such a transition. It is understood that the above is merely one illustrative example to which the disclosed subject matter is not limited.

Conversely, if the user 190's status changes to a state in which it is likely that the user 190 will interact with the apparatus 602, the login/authorization manager 612 may remove or transition the apparatus 602 (or portion thereof) from the reduced power mode to the prior power mode or an active power mode (e.g., the working power mode, etc.). In various embodiments, the status change detection and power mode transition may occur automatically via the techniques described above in reference to FIGS. 1, 2, 3, 4, and/or 5.

In various embodiments, the user 190 may also be authenticated into one or more security schemes. For example, the user 190 may have provided authentication or authorization details in order to access a network, various files (e.g., a network drive, encrypted files, etc.), software or web services (e.g., an employee database, a financial web site, etc.). In such an embodiment, each of these service or files may employ different authorization schemes. For example, a first service may allow the user 190 authorization until the user 190 actively logs out of the apparatus 602; a second service may allow authorization as long as the user 190 is at the apparatus 602; etc. In such an embodiment, the login/authorization manager 612 may selectively revoke the authorization of the user 190 based upon the respective rule systems or schemes employed by the plurality of services. For example, in the above example embodiment, when the user 190 changes their status by leaving the detection zone 650, the login/authorization manager 612 may maintain the authorization to the first service (if moving out of the detection one 650 is not considered actively logging off the apparatus 650), but may revoke the authorization to the second service. It is understood that the above are merely a few illustrative examples to which the disclosed subject matter is not limited.

In this context, the term "secure service(s)" refers to one or more services (e.g., web sites, file access, apparatus usage access, etc.) that require authorization of the user 190 before those secure services may be used by the user 190, and which may also restrict or limit the way a user may use the secure service based upon the user's authorization level. It is understood that the above are merely a few illustrative examples to which the disclosed subject matter is not limited.

In various embodiments, these authentication or authorization details for the secure services may be or have been provided automatically as part of the automatic login process, as described above. In another embodiment, these authentication or authorization details may have been provided manually by the user 190 or automatically via other means (e.g., a cookie in a web browser, a username/password pair via a third-party authentication service, etc.). In some embodiments, the authorization or the user 190 may be managed, in whole or in part, by the login/authorization manager 612.

In the illustrated embodiment in which the login/authorization manager 612 may selectively revoke or adjust the authorization of the user 190 in relation to a plurality of secure services, the login/authorization manager 612 may alter how the portion of the graphical information associated with those secure services is displayed by display 116. For example, if a user 190 has a web site associated with a secure service contained or displayed in a GUI window, and the login/authorization manager 612 revokes the user 190's authentication for that secure service, the GUI window containing or displaying the secured and no-longer authorized web site may be closed, dimmed, made illegible, minimized, or otherwise obscured or removed from display by the display 116. Likewise, secured but no longer authorized files or documents may be closed or encrypted or obscured, such that the information contained therein may not be accessible to an unauthorized viewer (e.g., user 690a of FIG. 6b, as described below). It is understood that the above are merely a few illustrative examples to which the disclosed subject matter is not limited.

In various embodiments, the login/authorization manager 612 may alter or adjust the authorization level of the user 190 to use the apparatus 602 based upon one or more rules. For example, the login/authorization manager 612 may alter or adjust the authorization level of the user 190 based upon the amount of time the user 190 has been absent from the detection zone 650. In one embodiment, if the user 190 has only been absence from the detection area 650 for a relatively short period of time (e.g., 5 minutes, etc.) the login/authorization manager 612 may merely lock or turn off the display 116. Whereas, if the user 190 has only been absence from the detection area 650 for a relatively long period of time (e.g., 20 minutes, etc.) the login/authorization manager 612 may log the user 190 out of the apparatus 602 and place the apparatus 602 in a reduced power mode (e.g., the suspend power mode, hibernate power mode, etc.). It is understood that the above is merely one illustrative example to which the disclosed subject matter is not limited.

In various embodiments, the login/authorization manager 612 may base its decision to adjust the authorization level of the user 190 on whether various factors or measures exceed one or more thresholds. In some embodiments, these influential factors or measures may include, but are not limited to: the availability of one or more system resources (e.g., battery power level, network bandwidth, network type, processor capacity, memory usage, storage availability, etc.), the consumption rate of one or more system resources, the amount of time the change in the user 190's status in regards to the apparatus has elapsed, the physical location of a user (e.g., user 190, user 690a of FIG. 6b, etc.), the physical location of the apparatus 602, etc. It is understood that the above are merely a few illustrative examples to which the disclosed subject matter is not limited.

FIG. 6b is a block diagram of an example embodiment of a system 601 in accordance with the disclosed subject matter. In one embodiment, the system 601 may include an apparatus 602b used by a user 190. As described above, the apparatus 602b may include a processor 115, a memory 114, a display 116, one or more sensors 106, a login/authorization manager 612, a login user interface 110, and a user recognizer 108. In various embodiments, the sensor 106 may include or have a detection area 650 in which the sensor 106 is configured to sense or operate, as described above.

In the illustrated embodiment, the user 190 may have already been detected and logged into the apparatus 602b, as described above. As such, the user 190's user data 120 may have been loaded into the memory 114 or otherwise made available to the apparatus 602b as part of the logging in process, as described above. In some embodiments, the user data 120 may have been altered or edited as part of the user 190's use of the apparatus 602b. For example, the user 190 may have opened or closed various documents or tabs, changed configuration settings (e.g., email servers, network settings, etc.) or other forms of user data 120.

In the illustrated embodiment, the user 690a may enter the detection area 650. The addition of a second or additional user (e.g., user 690a or user 690b, if user 690b enters the detection area 650, etc.) may be regarded as a change in the status of the first user 190 in regards to the apparatus 602b. In such an embodiment, the login/authorization manager 612 may alter or adjust the authorization of the first user 190 in regards to the apparatus 602b.

For example, in one embodiment, the login/authorization manager 612 may dim or turn off the display 116 so that the new user 690a may not see information displayed by the display 116 which the user 690a is not authorized to see. Likewise, audio outputs or other outputs may be restricted. The restriction of these outputs may substantially revoke the authorization the first user 190 previously had to view the display 116, the audio output, or other outputs of the apparatus 602b.

In another embodiment, the login/authorization manager 612 may determine the identity of the second user 690a. In some embodiments, this may include accessing the user data 620a associated with the new user 690a. Based upon this identification, the /authorization manager 612 may determine the authorization level held by the second user 690a. The login/authorization manager 612 may compare the new user 690a's authorization level to the first user 190's authorization level. As described above, various authorization levels may exist for various secured services. In such an embodiment, the login/authorization manager 612 may restrict usage of the apparatus 602b based upon the first authorization level of the first user 190 and the second authorization level of the second user 690a.

For example, in one embodiment, the apparatus 602b may only dim or turn off the display 116 (or other output devices, etc.) if the information displayed by the display 116 is not authorized to be displayed by both user 190 and user 690a. In another embodiment, the display 116 may only dim or obscure the portions of the display 116 (e.g., a GUI window, etc.) which includes information that is not authorized to be displayed by both user 190 and user 690a, while the portions which may be displayed to both users 190 and 690a may be unaltered or visible. In such an embodiment, the login/authorization manager 612 may adjust the effective authorization level of the first user 190 from the user 190's actual authorization level to an authorization level corresponding to the intersection (in the parlance of set theory) of the authorization levels of all the users within the detection area 650 (e.g., user 190 and user 690a, etc.). It is understood that the above are merely a few illustrative examples to which the disclosed subject matter is not limited.

In a less preferred embodiment, the login/authorization manager 612 may adjust the effective authorization level of the user 190 to the higher authorization level of either the user 190 or the user 690a. In another embodiment, the login/authorization manager 612 may adjust the effective authorization level to the union (again in the parlance of set theory) of the authorization levels of users 190 and 690a. In various embodiments, other rules or schemes for adjusting the authorization level of the user 190 and prohibiting the apparatus 602*b* from being used in a way that is consistent with the adjusted authorization level may be used. It is understood that the above are merely a few illustrative examples to which the disclosed subject matter is not limited.

In one embodiment, if the user 690*a* leaves or becomes absent from the detection area 650 and user 190 is left alone in the detection area 650, the status of the user 190 in regards to the apparatus may have changed. In such an embodiment, the login/authorization manager 612 may return or re-adjust the authorization level of the user 190 to the user 190's prior or natural authentication level. In another embodiment, if additional users (e.g., user 690*b*) enters the detection area 650, again the status of the user 190 may have changed and the login/authorization manager 612 may again adjust the authorization level of the user 190 based upon the users within the detection area 650 (e.g., users 190, 690*a*, 690*b*, users 190 and 690*b*, etc.).

In various embodiments, the detection of a change in the user 190's status in regards to the apparatus 602*b* may be triggered by both the detection of another user (e.g., user 690*a*, etc.) or the detection of the removal of presence another user, and a secondary consideration (e.g., a time element, etc.). For example, to generate a change in the status of the user 190, user 690*a* may have to both come within the detection area 650 and maintain a presence within the detection area 650 for a predefined number of minutes or seconds (e.g., 3 minutes, etc.). In such an embodiment, the occurrence of "false positive" or other statistical error may be reduced. For example, it may be disconcerting to user 190 for the display 116 to suddenly be turned off merely because user 690*b* had walked by, inadvertently coming within the detection area 650 of apparatus 602*b*. In such an embodiment, the login/authorization manager 612 may make use of some threshold value or hysteresis effect to reduce undesirable or frequent changes in the status of the user 190 in regards to the apparatus.

Figure 6C:
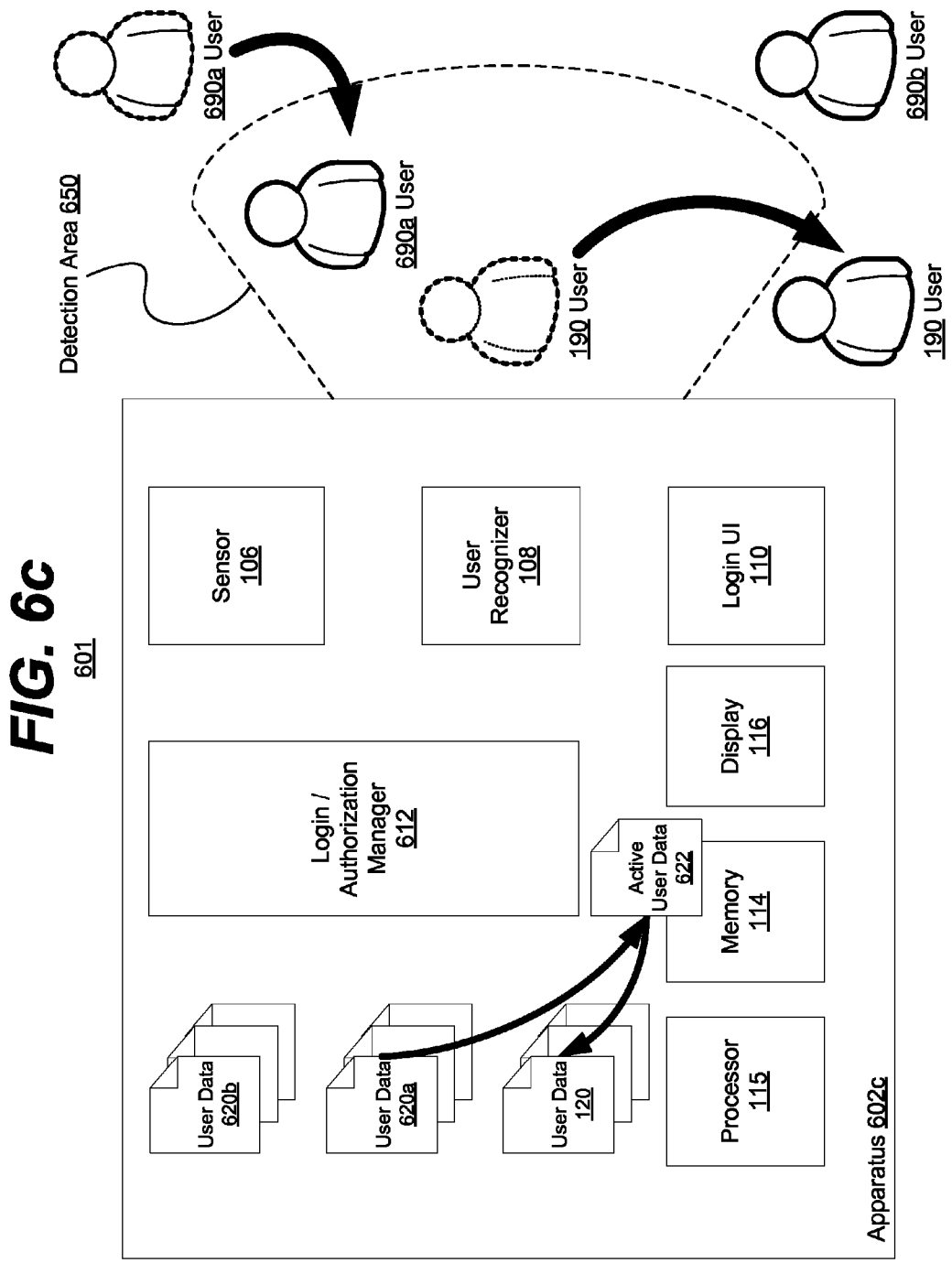
FIG. 6c is a block diagram of an example embodiment of a system in accordance with the disclosed subject matter.

FIG. 6*c* is a block diagram of an example embodiment of a system 601 in accordance with the disclosed subject matter. In one embodiment, the system 601 may include an apparatus 602*c* used by a user 190. As described above, the apparatus 602*c* may include a processor 115, a memory 114, a display 116, one or more sensors 106, a login/authorization manager 612, a login user interface 110, and a user recognizer 108. In various embodiments, the sensor 106 may include or have a detection area 650 in which the sensor 106 is configured to sense or operate, as described above.

In the illustrated embodiment, the user 190 may have already been detected and logged into the apparatus 602*c*, as described above. As such, the user 190's user data 120 may have been loaded into the memory 114 or otherwise made available to the apparatus 602*c* as part of the logging in process, as described above. In the illustrated embodiment, the user 190's user data 120 may be stored in or considered to be the active user data 622. In the illustrated embodiment, the active user data 622 may include the user data for the user actively logged into the apparatus 602*c*. In some embodiments, the user data 120 or 622 may have been altered or edited as part of the user 190's use of the apparatus 602*c*, as described above.

In the illustrated embodiment, the user 690*a* may enter the detection area 650. The addition of a second or additional user (e.g., user 690*a* or user 690*b*, if user 690*b* enters the detection area 650, etc.) may be regarded as a change in the status of the first user 190 in regards to the apparatus 602*c*. In such an embodiment, the login/authorization manager 612 may alter or adjust the authorization of the first user 190 in regards to the apparatus 602*c*, as described above in reference to FIG. 6*b*.

However, in the illustrated embodiment, user 190 may then choose to leave the detection zone 650. In such an embodiment, the absence of user 190 may generate a change in the status of the user 190 in regards to the apparatus 602*c*. As described above in reference to FIG. 6*a*, the login/authorization manager 612 may alter or adjust the authorization of the first user 190 by logging the user 190 out of the apparatus 602*c*. In various embodiments, this may include removing the user 190's user data 120 from the active user data 622 status. In another embodiment, the login/authorization manager 612 may lock (e.g., via a screen lock, a password re-authorization, etc.) the user 190 out of the apparatus 602*c*. It is understood that the above are merely a few illustrative examples to which the disclosed subject matter is not limited.

In one embodiment, the user 690*a* may be alone in the detection area 650. In such an embodiment, the login/authorization manager 612 may automatically determine the identity of the second user 690*a* and automatically log the second or new user 690*a* into the apparatus 602*c*, as described above in reference to FIGS. 1, 2, 3, 4, and 5. In such an embodiment, the user data 620*a* of the user 690*a* may be considered or made the active user data 622.

In various embodiments, the user 190 may choose other means to log out or relinquish control of the apparatus 602*c*. For example, in one embodiment, the user 190 may stay within the detection area 650 but move behind user 690*a*. For example, user 190 may get up from the chair in front of the apparatus 602*c*, user 690*a* may then sit down in that chair, and user 190 may stand behind user 690*a*. Conversely, in some embodiments, the user 190 may actively log-out or lock themselves out of the apparatus 602*c*, as described above. In such an embodiment, the login/authorization manager 612 may be configured to determine when the first user 190 has relinquished control of the apparatus 602*c* to a second user 690*b*. It is understood that the above is merely one illustrative example to which the disclosed subject matter is not limited.

In various embodiments, the login/authorization manager 612 may be configured to replace the active user data 622 with the new, second user 290*a*'s user data 620*a*, either in whole or part. For example, in one embodiment, the login/authorization manager 612 may be configured to change the authorization level, which governs the uses and ways in which the apparatus 602*c* may be used, from the first user 190's authorization level to the second user 690*a*'s authorization level, while maintaining the first user 190's configuration and setting user data 120 or a portion thereof as the active user data 622. In such an embodiment, a manager or user with higher or greater authorization levels (e.g., user 690*a*, etc.) may temporarily access or use the apparatus 602*c* with their higher authorization level without fully logging the user 190 out of the apparatus 602*c*. It is understood that the above is merely one illustrative example to which the disclosed subject matter is not limited.

Figure 7:
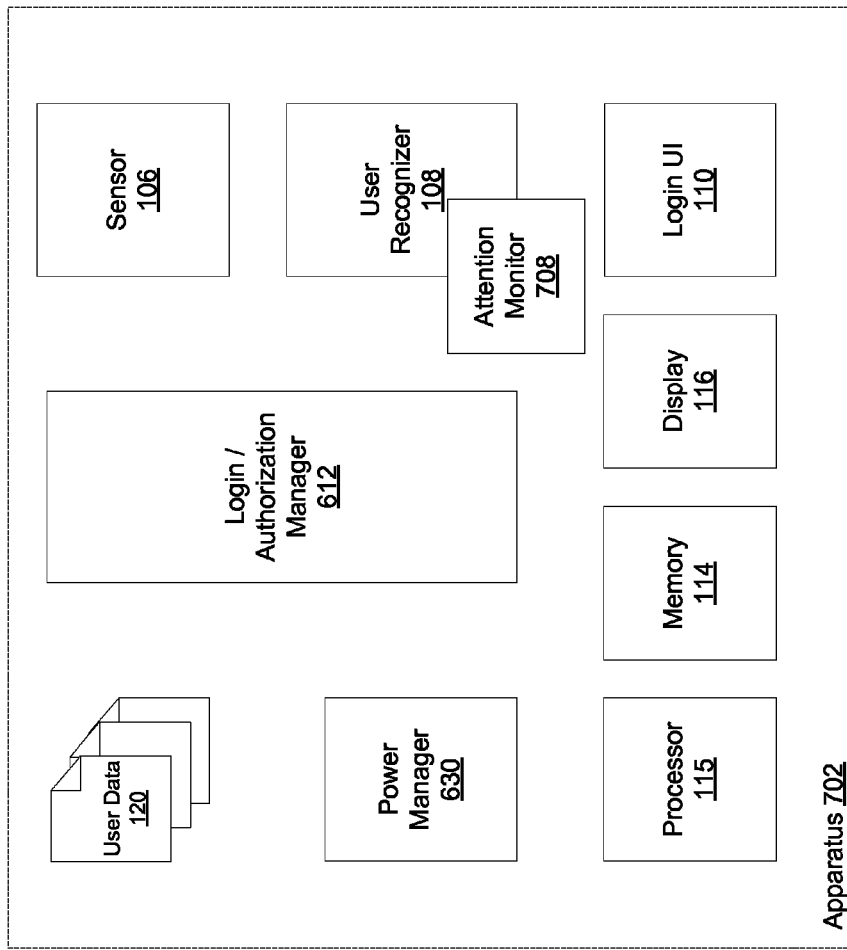
FIG. 7 is a block diagram of an example embodiment of a system in accordance with the disclosed subject matter.

FIG. 7 is a block diagram of an example embodiment of a system 700 in accordance with the disclosed subject matter. In one embodiment, the system 700 may include an apparatus 702 used by a user 190. As described above, the apparatus 702 may include a processor 115, a memory 114, a display 116, one or more sensors 106, a login/authorization manager 612, a login user interface 110, and a user recognizer 108. In various embodiments, the sensor 106 may include or have a detection area (not shown in FIG. 7) in which the sensor 106 is configured to sense or operate, as described above.

In the illustrated embodiment, the user 190 may have already been detected and logged into the apparatus 702, as described above. As such, the user 190's user data 120 may have been loaded into the memory 114 or otherwise made available to the apparatus 702 as part of the logging in process, as described above. In some embodiments, the user data 120 may have been altered or edited as part of the user 190's use of the apparatus 702, as described above.

In one embodiment, the sensor 106 or the user recognizer 108 may be configured to monitor the attentiveness or the user 190 in regards to the apparatus. In this context, "attentiveness to the apparatus" may include listening or watching with some interest or concentration the output of the apparatus (e.g., the display 116, etc.) or inputting information or instructions into the apparatus 702 (e.g., via a keyboard, mouse, touchscreen, etc.). In such an embodiment, the apparatus 702 may include an attention monitor 708 configured to monitor the attentiveness or the user 190 in regards to the apparatus. In various embodiments, the attention monitor 708 may be included in the sensor 106, user recognizer 108, login/authorization manager 612, or other component of the apparatus 702.

In various embodiments, the attention monitor 708 may measure the user 190's attentiveness by monitoring the position or focal point of the user 190's eyes, the orientation of the user's head (e.g., if the user 190 is looking at the apparatus 702 or looking away from the apparatus 702, etc.), the presence or absence of the user 190, as described above, the input rate of the user 190 (e.g., keystrokes or mouse movements per a given period of time, etc.), etc. It is understood that the above are merely a few illustrative examples to which the disclosed subject matter is not limited.

In various embodiments, the attention monitor 708 may determine the attentiveness of the user 190 based upon one or more rules or threshold values. For example, if the user 190 looks away from the apparatus 702 for a relatively short period of time (e.g., 5 seconds, etc.), the attention monitor 708 may determine that the user 190 is still attentive to the apparatus 702. Conversely, if the user 190 looks away for a relatively long period of time (e.g., 5 minutes, etc.) the attention monitor 708 may determine that the user 190 is no longer attentive to the apparatus 702.

In another embodiment, the attention monitor 708 may determine attentiveness of the user 190 while taking into consideration the application(s) executing on the apparatus 702. For example, the thresholds or rules mentioned above may allow for more inattentiveness if the user 190 is executing a movie application as opposed to a word processing application. In such an embodiment, the if the user 190 looks away for a relatively long period of time (e.g., 5 minutes, etc.) but a movie is playing on the apparatus 702, the attention monitor 708 may determine that the user 190 is still attentive to the apparatus 702. However, if the user 190 looks away for an extremely long period of time (e.g., 15 minutes, etc.) and a movie is playing on the apparatus 702, the attention monitor 708 may then determine that the user 190 is no longer attentive to the apparatus 702. It is understood that the above is merely one illustrative example to which the disclosed subject matter is not limited.

In one embodiment, a change in the attentiveness of the user 190 to the apparatus 702 may be considered a change in the status of the user 190 in regards to the apparatus 702. In such an embodiment, the login/authorization manager 612 may adjust the authorization level of the user 190, as described above (e.g., logging the user 190 out of the apparatus 702, placing the apparatus 702 in a low power mode, etc.).

In various embodiments, the login/authorization manager 612 may adjust the authorization level of the user 190 may include pausing the execution of an application, de-authenticating the user 190 from one or more secure services, or placing one or more portions of the apparatus 702 in a reduced power mode, etc. It is understood that the above are merely a few illustrative examples to which the disclosed subject matter is not limited.

For example, in the illustrated embodiment, if the user 190 turns their head away from the apparatus 702, the login/authorization manager 612 may turn off the display 116. When the attention monitor 708 detects that the user 190's status in regards to the apparatus 702 has again changed by turning the user 190's head back to the apparatus 702, the login/authorization manager 612 may adjust the user 190's authorization level by turning the display 116 back on.

For example, in another embodiment, the login/authorization manager 612 may pause the execution a video application if the user 190 is looking away from the apparatus 702. But, the login/authorization manager 612 may decide not to pause the execution an audio application if the user 190 is looking away from the apparatus 702. Instead, the login/authorization manager 612 may decide to mute or pause the execution an audio application if the user 190 has walked away from the apparatus 702.

In yet another embodiment, the login/authorization manager 612 may base how the authorization level of the user 190 is adjusted based upon the level of system resources available to the apparatus 702. For example, the login/authorization manager 612 may not turn off the display 116 of the apparatus 702 is using an external power source (e.g., plugged into an electrical outlet, etc.). However, fi the apparatus 702 is using a battery to supply electrical power the login/authorization manager 612 may more aggressive in reduced in the power consumption of the apparatus 702. It is understood that the above are merely a few illustrative examples to which the disclosed subject matter is not limited.

FIG. 8*a* is a flow chart of an example embodiment of a technique in accordance with the disclosed subject matter. In various embodiments, the technique 800 may be used or produced by the systems such as those of FIG. 1, 2, 3, 4, 5, or 10. It is understood that the disclosed subject matter is not limited to the ordering of or number of actions illustrated by technique 800.

Block 802 illustrates that, in one embodiment, the presence of a user may be automatically detected by an apparatus, as described above. In various embodiments, detecting the presence of the user may include detecting the presence of a user via a proximity sensor included by the apparatus, as described above. In one embodiment, detecting the presence of a user may include detecting the presence of the user within a detection area, such as a detection area of a sensor, as described above. In some embodiments, detecting may include detecting the presence of an identifying device, as described above. In another embodiment, detecting may include detecting the presence of a plurality of potential users of the apparatus, and selecting, based upon a predefined set of criteria, one user from the plurality of potential users, as described above. In various embodiments, one or more of the action(s) illustrated by this Block may be performed by the apparatuses or systems of FIG. 1, 2, 3, 4, 5, or 10, the sensors 106 of FIG. 1, 2, 3, 4, or 5, as described above.

Block 804 illustrates that, in one embodiment, the identity of the detected user may be determined, as described above. In such an embodiment, this determination of the user's identification may occur in response to the detecting a user within the detection area. In various embodiments, determining the user's identity may include selecting, based upon a predefined set of criteria, one user from a plurality of potential users, as described above. In another embodiment, determining the user's identity may include comparing the detected user's facial features against a plurality of potential user's facial features, as described above. In yet another embodiment, determining the user's identify may include accessing photographs of potential users from at least one remote server, as described above. The determining may further include comparing the photographs of the potential users against the physical features of detected user, as described above. Determining may also include identifying the detected user based upon the comparison of the photographs, as described above. In various embodiments, one or more of the action(s) illustrated by this Block may be performed by the apparatuses or systems of FIG. 1, 2, 3, 4, 5, or 10, the user recognizer 108 of FIG. 1, 2, 3, 4, or 5, as described above.

Block 806 illustrates that, in one embodiment, automatically logging the identified user into the apparatus may occur, as described above. In such an embodiment, automatically logging the user into the apparatus may be based on the determined identity of the user. In various embodiments, logging the user into the apparatus may include loading user data, as described above. In various embodiments, one or more of the action(s) illustrated by this Block may be performed by the apparatuses or systems of FIG. 1, 2, 3, 4, 5, or 10, the login manager 112 or the login user interface 110 of FIG. 1, 2, 3, 4, or 5, as described above.

FIG. 8b is a flow chart of an example embodiment of a technique in accordance with the disclosed subject matter. In various embodiments, the technique 801 may be used or produced by the systems such as those of FIG. 1, 2, 3, 4, 5, or 10. It is understood that the disclosed subject matter is not limited to the ordering of or number of actions illustrated by technique 801.

Block 802 illustrates that, in one embodiment, the presence of a user may be automatically detected by an apparatus, as described above. In various embodiments, detecting the presence of the user may include detecting the presence of a user via a proximity sensor included by the apparatus, as described above. In one embodiment, detecting the presence of a user may include detecting the presence of the user within a detection area, such as a detection area of a sensor, as described above. In some embodiments, detecting may include detecting the presence of an identifying device, as described above. In another embodiment, detecting may include detecting the presence of a plurality of potential users of the apparatus, and selecting, based upon a predefined set of criteria, one user from the plurality of potential users, as described above. In various embodiments, one or more of the action(s) illustrated by this Block may be performed by the apparatuses or systems of FIG. 1, 2, 3, 4, 5, or 10, the sensors 106 of FIG. 1, 2, 3, 4, or 5, as described above.

Block 804 illustrates that, in one embodiment, the identity of the detected user may be determined, as described above. In such an embodiment, this determination of the user's identification may occur in response to the detecting a user within the detection area. In various embodiments, determining the user's identity may include selecting, based upon a predefined set of criteria, one user from a plurality of potential users, as described above. In another embodiment, determining the user's identity may include comparing the detected user's facial features against a plurality of potential user's facial features, as described above. In yet another embodiment, determining the user's identify may include accessing photographs of potential users from at least one remote server, as described above. The determining may further include comparing the photographs of the potential users against the physical features of detected user, as described above. Determining may also include identifying the detected user based upon the comparison of the photographs, as described above. In various embodiments, one or more of the action(s) illustrated by this Block may be performed by the apparatuses or systems of FIG. 1, 2, 3, 4, 5, or 10, the user recognizer 108 of FIG. 1, 2, 3, 4, or 5, as described above.

Block 808 illustrates that, in one embodiment, loading, by the apparatus, user data associated with the identified of the determined user may occur, as described above. In one embodiment, loading the user data may include at least part of the process of logging the identified user in to the apparatus, as described above. In various embodiments, loading the user data may include fully logging the user in to the apparatus, as described above. In another embodiment, loading the user data may include retrieving at least part of the user data from a remote server, wherein the remote server stores user data for a plurality of users, as described above. In various embodiments, one or more of the action(s) illustrated by this Block may be performed by the apparatuses or systems of FIG. 1, 2, 3, 4, 5, or 10, the login manager 112 or the login user interface 110 of FIG. 1, 2, 3, 4, or 5, as described above.

Block 810 illustrates that, in one embodiment, the user may automatically be presented with a request to enter or provide the user's security or authentication credentials, as described above. In yet another embodiment, loading the user data may include determining that logging the user into the apparatus requires the presentation of security credentials (e.g., entering a password, etc.), as described above. In such an embodiment, loading the user data may include loading the user data associated with the identified user, as described above. In various embodiments, one or more of the action(s) illustrated by this Block may be performed by the apparatuses or systems of FIG. 1, 2, 3, 4, 5, or 10, the login manager 112 or the login user interface 110 of FIG. 1, 2, 3, 4, or 5, as described above.

Block 812 illustrates that, in one embodiment, the technique 801 may also include completing the logging in of the user into the apparatus, once the user has presented the proper security credentials, as described above. In various embodiments, one or more of the action(s) illustrated by this Block may be performed by the apparatuses or systems of FIG. 1, 2, 3, 4, 5, or 10, the login manager 112 or the login user interface 110 of FIG. 1, 2, 3, 4, or 5, as described above.

FIG. 9 is a flow chart of an example embodiment of a technique in accordance with the disclosed subject matter. In various embodiments, the technique 900 may be used or produced by the systems such as those of FIG. 6a, 6b, 6c, 7, or 10. It is understood that the disclosed subject matter is not limited to the ordering of or number of actions illustrated by technique 900.

Block 902 illustrates that, in one embodiment, the presence of a user may be automatically detected by an apparatus, as described above. In various embodiments, detecting the presence of the user may include detecting the presence of a user via a proximity sensor included by the apparatus, as described above. In some embodiments, detecting may include detecting the presence of an identifying device, as described above. In another embodiment, detecting may include detecting the presence of a plurality of potential users of the apparatus, and selecting, based upon a predefined set of criteria, one user from the plurality of potential users, as described above. In various embodiments, one or more of the action(s) illustrated by this Block may be performed by the apparatuses or systems of FIG. 1, 2, 3, 4, 5, or 10, the sensors 106 of FIG. 1, 2, 3, 4, or 5, as described above.

Block 604 illustrates that, in one embodiment, a change in the first user's status in relation to the apparatus may be automatically detected, as described above. In various embodiments, detecting a change in the first user's status may include automatically detecting the presence of a second user via at least one sensor operably coupled with the apparatus, as described above. In some embodiments, detecting a change in the first user's status may include detecting that the first user has left a detection area of the sensor operably coupled with the apparatus, as described above. In one embodiment, detecting a change in the first user's status may include detecting that the first user is not attentive to the apparatus, as described above. In such an embodiment, detecting a change in the first user's status may include detecting that the first user is not looking at the apparatus, as described above. In yet another embodiment, detecting a change in the first user's status may include detecting the change in the user's status via at least one a sensor technique that includes at least one of the following: detecting an absence of the first user using a proximity sensor operably coupled with the apparatus, detecting a presence of the first user using a wireless signal to detect an identification device associated with the first user, detecting a presence of a second user using a proximity sensor operably coupled with the apparatus, detecting an orientation of a head of the first user using a camera, or detecting whether the eyes of the first user are looking at the apparatus by using a camera for sensing visible light, as described above. In various embodiments, detecting a change in the first user's status may include detecting an absence of the first user from a sensor detection area, as described above. In various embodiments, one or more of the action(s) illustrated by this Block may be performed by the apparatuses or systems of FIG. 6a, 6b, 6c, 7 or 10, the user recognizer 108, login/authorization manger 612 or attention monitor 708 of FIG. 6a, 6b, 6c, 7 or 10, as described above.

Block 906 illustrates that, in one embodiment, automatically adjusting, based upon the first user's status change, the authorization of the first user to use the apparatus, as described above. In various embodiments, adjusting may include automatically logging, at least partially, the first user out of the apparatus, as described above. In some embodiments, adjusting may include automatically determining an identity of the detected second user, determining an authorization level of the second user to use the apparatus, and prohibiting the apparatus from being used in a way that is not authorized for both the first user and the second user, as described above. In another embodiment, adjusting may include placing the apparatus in a reduced power mode, as described above. In such an embodiment, adjusting may include reducing the brightness of a display included by the apparatus, as described above. In some embodiments, adjusting may include automatically logging, at least partially, the first user out of the apparatus, as described above. In some embodiments, a second user may be detected and logged into the apparatus once the first user has been logged out, as described above. In various embodiments, one or more of the action(s) illustrated by this Block may be performed by the apparatuses or systems of FIG. 6a, 6b, 6c, 7 or 10, the user recognizer 108, login/authorization manger 612 or attention monitor 708 of FIG. 6a, 6b, 6c, 7 or 10, as described above.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of managing a first user's use of an apparatus, the method comprising:
   automatically detecting via at least one sensor operably coupled with the apparatus, a presence of the first user within a detection area, wherein the first user is logged in to use the apparatus, the first user being authorized to access on a display of the apparatus only information associated with an authorization level of the first user;
   displaying information that the first user is authorized to access on the display;
   automatically detecting via the at least one sensor operably coupled with the apparatus, a presence of a second user within the detection area, the second user being authorized to access on the display only information associated with an authorization level of the second user but being unauthorized to access on the display information not associated with the authorization level of the second user;
   when the information displayed on the display includes information that the second user is authorized to access and information that the second user is unauthorized to access, obscuring or removing information on display that the second user is unauthorized to access, while continuing to display information that both the first user and the second user are authorized to access; and
   when the information displayed on the display includes no information that the second user is authorized to access, obscuring or removing all of the information displayed.

2. An apparatus comprising:
   at least one sensor configured to automatically detect a presence of a first user and a second user within a detection area, wherein the first user is logged in to use the apparatus, the first user being authorized to access on a display of the apparatus only information associated with an authorization level of the first user and the second user being authorized to access on the display only information associated with an authorization level of the second user but being unauthorized to access on the display information not associated with the authorization level of the second user; and
   a processor that is operably coupled to the sensor and configured to:
   display information that the first user is authorized to access on the display;
   when the information displayed on the display includes information that the second user is authorized to access and information that the second user is unauthorized to access, obscure or remove information on display that the second user is unauthorized to access, while continuing to display information that both the first user and the second user are authorized to access; and
   when the information displayed on the display includes no information that the second user is authorized to access, obscure or remove all of the information displayed.

3. A non-transitory computer-readable medium being tangibly embodied and including executable code that causes an apparatus to:
   automatically detect, via at least one sensor operably coupled with the apparatus, a presence of a first user and a second user within a detection area, wherein the first user is logged in to use the apparatus, the first user being authorized to access on a display of the apparatus only information associated with an authorization level of the first user and the second user being authorized to access on the display only information associated with an authorization level of the second user but being unauthorized to access on the display information not associated with the authorization level of the second user;
   when the information displayed on the display includes information that the second user is authorized to access and information that the second user is unauthorized to access, obscure or remove information on display that the second user is unauthorized to access, while continuing to display information that both the first user and the second user are authorized to access; and
   when the information displayed on the display includes no information that the second user is authorized to access, obscure or remove all of the information displayed.

4. The method of claim 1 further comprising, in response to detecting the presence of the second user within the detection area, adjusting the first user's authorization to use the apparatus.

5. The method of claim 4, wherein adjusting the first user's authorization to use the apparatus includes logging the first user out of the apparatus.

6. The method of claim 4, wherein adjusting the first user's authorization to use the apparatus includes partially logging the first user out of the apparatus.

7. The method of claim 4, wherein adjusting the first user's authorization to use the apparatus includes requiring the first user to re-authenticate.

8. The method of claim 4, wherein obscuring or removing all of the information displayed includes turning off the display.

9. The method of claim 1, wherein detecting the presence of the second user within the detection area includes using a facial recognition technique.

10. The apparatus of claim 2, wherein the processor is further configured to, in response to detecting the presence of the second user within the detection area, adjust the first user's authorization to use the apparatus.

11. The apparatus of claim 10, wherein the processor configured to adjust the first user's authorization to use the apparatus is configured to log the first user out of the apparatus.

12. The apparatus of claim 10, wherein the processor configured to adjust the first user's authorization to use the apparatus is configured to partially log the first user out of the apparatus.

13. The apparatus of claim 10, wherein the processor configured to adjust the first user's authorization to use the apparatus is configured to display a screen that requires the first user to re-authenticate.

14. The apparatus of claim 2, wherein the processor configured to obscure or remove all of the information displayed is configured to turn off or dim the display.

15. The apparatus of claim 2, wherein the at least one sensor to automatically detect the presence of the first user and the second user within the detection area includes at least one of a touchpad, a mouse, a capacitive sensor, a conductive sensor and a imaging device.

16. The non-transitory computer-readable medium of claim 3, wherein the executable code causes the apparatus to, in response to detecting the presence of the second user within the detection area, adjust the first user's authorization to use the apparatus.

17. The non-transitory computer-readable medium of claim 16, wherein the executable code causes the apparatus to log the first user out of the apparatus.

18. The non-transitory computer-readable medium of claim 16, wherein the executable code causes the apparatus to partially log the first user out of the apparatus.

19. The non-transitory computer-readable medium of claim 16, wherein the executable code causes the apparatus to display a screen that requires the first user to re-authenticate.

20. The non-transitory computer-readable medium of claim 3, wherein the executable code causes the apparatus to turn off or dim the display to obscure or remove all of the information displayed.

* * * * *